March 29, 1932. C. J. SMITH 1,851,734
COATING MACHINE
Filed Aug. 31, 1927 2 Sheets-Sheet 1

INVENTOR
Clyde J. Smith
BY
*Ernest Hopkinson*
ATTORNEY

March 29, 1932. C. J. SMITH 1,851,734
COATING MACHINE
Filed Aug. 31, 1927 2 Sheets-Sheet 2
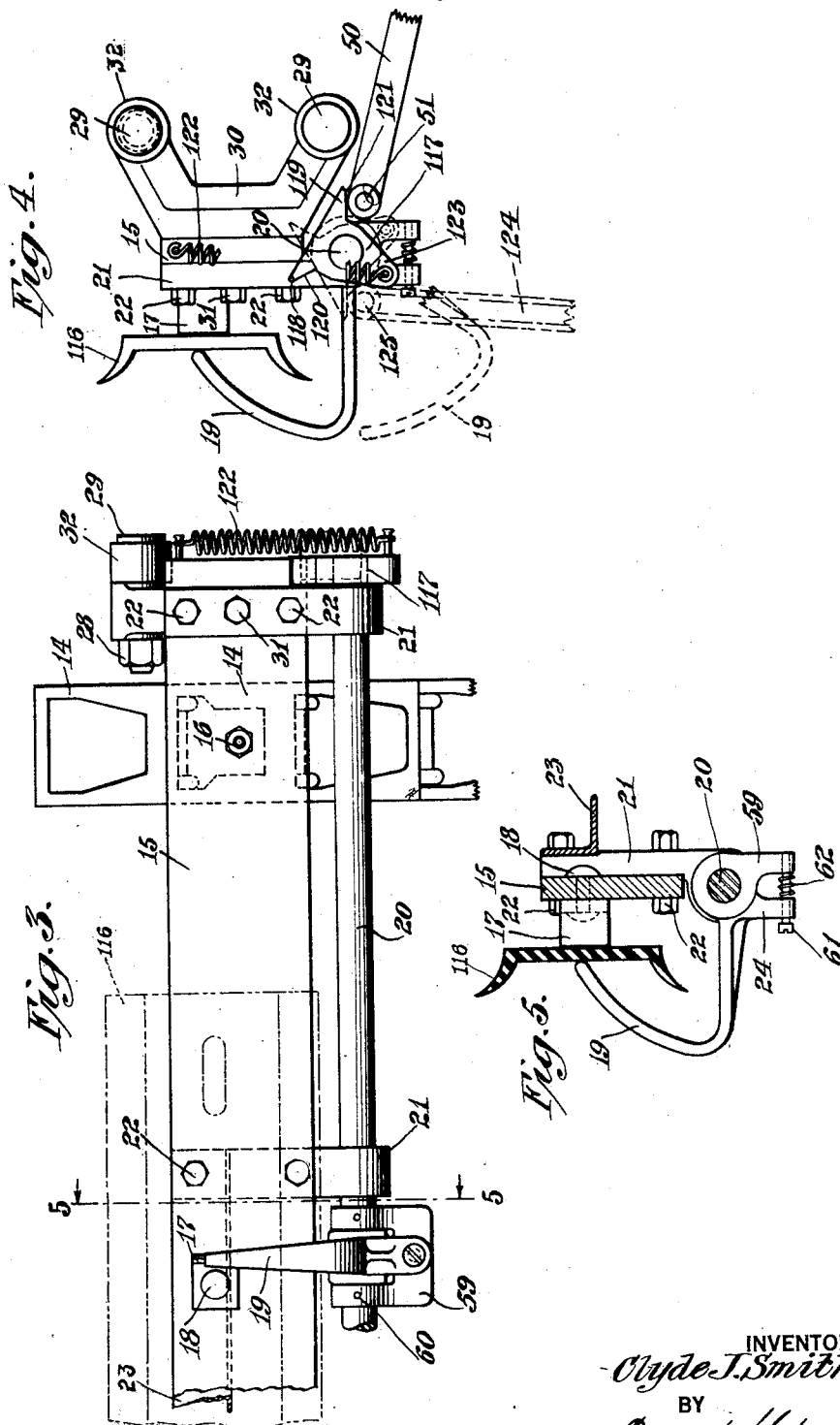
INVENTOR
Clyde J. Smith
BY
ATTORNEY

Patented Mar. 29, 1932

1,851,734

UNITED STATES PATENT OFFICE

CLYDE J. SMITH, OF DETROIT, MICHIGAN, ASSIGNOR TO MORGAN & WRIGHT, OF DETROIT, MICHIGAN, A CORPORATION OF MICHIGAN

COATING MACHINE

Application filed August 31, 1927. Serial No. 216,502.

This invention relates to a machine for coating articles with a fluid composition. More particularly it relates to a machine for painting truck tire flaps.

It has been customary in painting truck tire flaps to dip the same manually into a body of liquid coating composition, after which they are suspended from a support until dry. Such a method has been time consuming, has required considerable manual labor, and has resulted in defectively coated articles, unless a high degree of care and attention has been exerted by the operatives.

It is an object of this invention to provide a mechanism for automatically coating tire flaps with liquid coating composition and for drying the same without injury to the deposit of coating composition thereon. Other objects will be apparent from the specification and from the drawings, in which latter:

Fig. 3 is a detail of a portion of a cross member of the conveyor illustrating the mechanism for gripping the flaps;

Fig. 4 is a diagrammatic view illustrating the opening and closing of the gripping mechanism; and Fig. 5 is a section along the line 5—5 of Fig. 3.

Figures 1, 2:
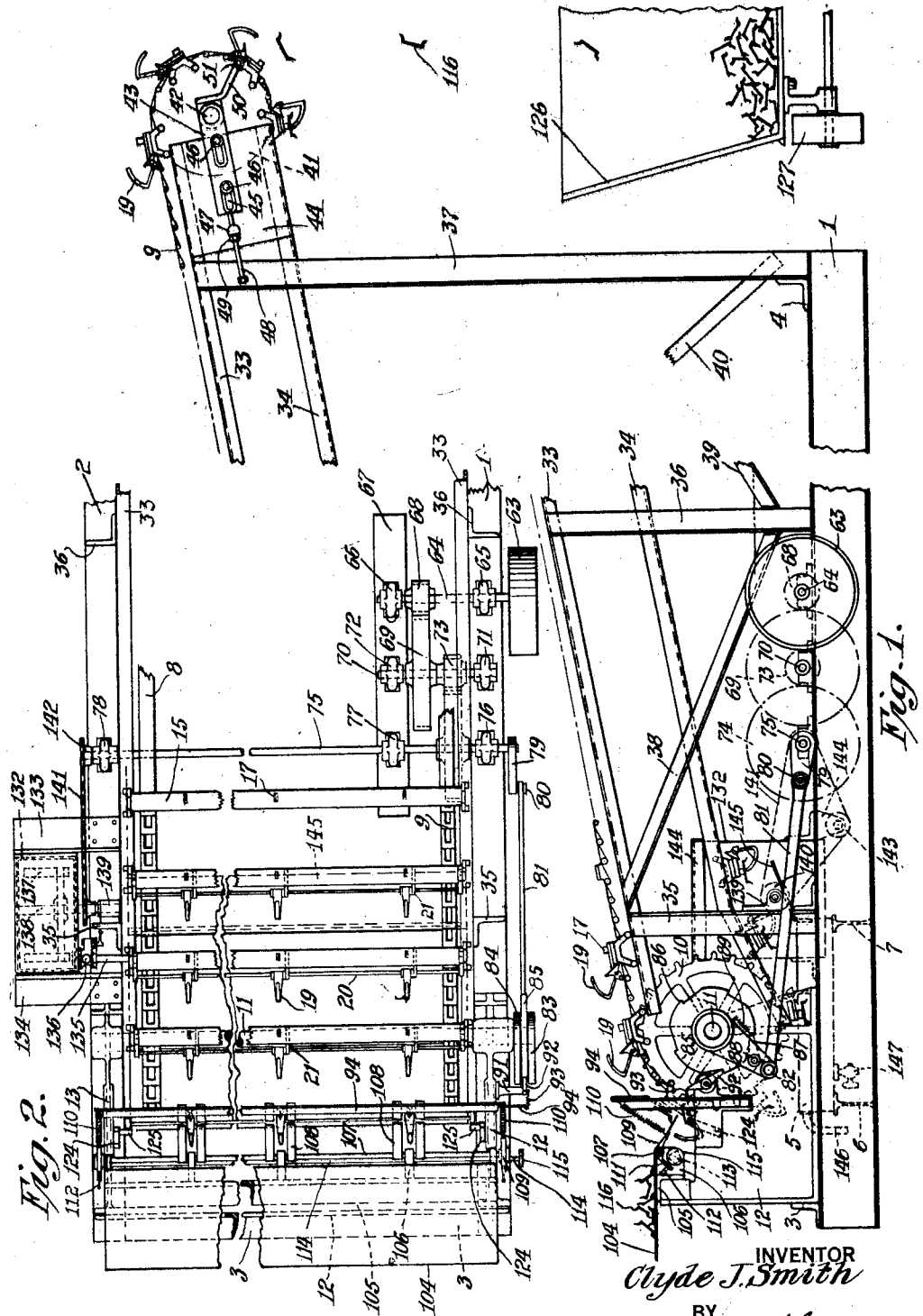
Fig. 1 is a side elevation of the machine, partly broken away.
Fig. 2 is a plan view of a portion of Fig. 1.

Referring particularly to the drawings, the supporting frame of the machine is comprised of the beams 1 and 2 which are held in position by the angle bars 3 and 4 which extend between the same. A receptacle 5 for liquid coating composition is carried by the I-beams 6 and 7 which in turn are supported by the beams 1 and 2. An endless conveyor is provided for carrying the tire flaps into and through the liquid coating composition in the receptacle 5. The continuous elements of this conveyor are the chains 8 and 9 which are supported and driven at one end by the sprockets 10. These sprockets are mounted upon a shaft 11 which is carried rotatably by brackets 12 and 13 in a position directly over the receptacle 5. The brackets 12 and 13 are rigidly affixed to the beams 1 and 2 respectively.

The elements of the conveyor for supporting the tire flaps are constructed as follows: Spaced links 14 of the chains 8 and 9 are provided with raised portions which carry the cross bars or elements 15 bolted thereto by the bolts 16 (Fig. 3). The cross bars carry knife edged elements or supports 17 which are secured thereto at spaced intervals by rivets 18. These elements present a small engaging surface to support the tire flap so that the flap presents an almost continuous surface to the liquid coating composition. The tire flaps are secured against the members 17 by means of clamps or finger portions 19. The clamps 19 are mounted upon a shaft 20 which in turn is rotatably carried in brackets 21 which are secured by bolts 22 or otherwise to the cross bar 15. The shaft 20 extends the length of the cross bar 15 and the clamps 19 are positioned at the same intervals thereon as the knife edged supports 17 are positioned on the cross bars so that the knife edged supports 17 and the clamps 19 cooperate to grip the tire flaps.

The clamp 19 grips the tire flaps with a flexible grip to compensate for slight variable thicknesses therein by the following arrangement of parts (see Figs. 3, 4 and 5). The clamp is pivotally mounted upon the shaft or supporting means 20. A bracket 59 is rigidly affixed to the shaft by means of pins 60, the bracket being a U-shaped member and provided with an opening in which a bolt 61 can be rigidly secured, which bolt extends loosely through an opening in a flange 24 of the clamp 19. A spiral spring 62 is positioned around the bolt and bears at one end against the flange 24 and at the other end against the bracket 59. As the shaft 20 is rotated in a direction to cause the clamp 19 to grip the tire flap, the spring 62 will form a yielding abutment for the clamp. An angle bar 23 is secured to the under side of the brackets 21 serving as a brace or support for the cross bar 15.

Means are provided for guiding and for preventing sagging of the conveyor as follows: Each cross bar 15 is provided with a bracket 30 secured to the ends thereof by a bolt 31 which bolt passes through the bracket 21 securing the three elements as a unit.

The brackets 30 are provided with rolls 32 rotatably mounted on spindles 29 which latter project laterally from the bracket and are secured thereto by nuts 28. The rolls provide a bearing surface having a minimum of friction. They travel upon the guide rails 33 and 34 which are positioned in an inclined path corresponding in general to the path of the conveyor. Rails 33 and 34 are rigidly secured to suitable supports 35, 36 and 37 which in turn are rigidly affixed to the beams 1 and 2. Suitable braces 38, 39 and 40 strengthen the supports 35, 36 and 37. It will be noted that the portions of rails 34 adjacent receptacle 5 are sharply inclined. At the discharge end of the conveyor the chains pass over sprockets 41 which are rotatably carried by the shaft 42. Shaft 42 is carried in bearings 43 which are adjustably supported on elements 44 rigidly secured to the rails 33 and 34. The bearings 43 are provided with a plurality of slots 45 through which there extend bolts 46 which adjustably secure the bearings to the elements 44. A bracket 47 projects rigidly from the element 44 and carries an adjusting screw 48 by turning which the position of bearings 43 may be varied when bolts 46 are loosened, to thereby tighten or loosen the chains 8 and 9. A nut 49 locks the screw 48 in adjusted position. The bearing 43 carries rigidly a bracket 50 which projects outwardly and carries a roll 51 to unlatch the clamp 19 in a manner to be described later.

The conveyor is driven from a pulley wheel 63 which is rigidly affixed upon a shaft 64. Shaft 64 is rotatably mounted in suitable bearings 65 and 66 which are rigidly secured upon the beams 1 and 67 respectively. Shaft 64 carries sprocket 68 rigidly secured thereto which is adapted to engage and drive a sprocket 69 which is rigidly secured to a shaft 70. The shaft 70 is rotatably mounted in bearings 71 and 72 which are rigidly secured to the beams 1 and 67 respectively. Shaft 70 carries rigidly a sprocket 73 which is adapted to mesh with a sprocket 74 rigidly secured upon the shaft 75. Shaft 75 is mounted for rotation in bearings 76, 77 and 78 which are rigidly secured upon the beams 1, 67 and 2 respectively. A short crank 79 is rigidly affixed at one end to the shaft 75 and at its other end carries a pintle 80 upon which a connecting rod 81 is rotatably mounted adjacent one end thereof. At its opposite end the rod 81 is secured by a pin 82 between the pawl arms 83 and 84 rotatively mounted on shaft 11. A ratchet wheel 85 is rigidly affixed to the shaft 11, between the pawl arms 83 and 84, and is provided with five shoulders 86 positioned at equal intervals upon the periphery thereof. A pawl 87 is pivotally mounted in the pawl arms 83 and 84 on a pin 88, and is held in engagement with ratchet wheel 85 by a spring 89. During movement of the rod 81 in one direction, the pawl 87 engages one of the shoulders 86 upon the ratchet wheel and forces the same in a counter-clockwise direction, as viewed in Fig. 1, for one-fifth of a revolution. When the rod 81 moves rearwardly to engage a new shoulder 86, the ratchet wheel is prevented from possible clockwise rotation by means of a pawl 92 which is pivotally mounted upon a bracket 91 which projects outwardly from the bracket 12. The pawl 92 is normally maintained in engagement with the periphery of the ratchet wheel 85 by means of a spring 93 which is secured at one end to the pawl 90 and at its opposite end to a bracket 94. The latter is supported by the brackets 12 and 13 and projects across the conveyor in spaced relation thereto.

Feeding of the tire flaps to the conveyor is effected from the table 104 which is rigidly secured to an angle bar 105 which latter is carried by and extends between the brackets 12 and 13. Brackets 106 project from the angle bar 105 at spaced intervals and carry spindle 107 upon which are rigidly mounted the guides 108 which latter are preferably positioned in pairs extending diagonally toward the conveyor and so placed that each pair is in alignment with a clamp 19. The guides are adjustable for any size tire flap by the following arrangement of elements. The spindle 107 carries at each end thereof rigidly secured thereto a lever 109 to one end of which is attached a spring 110 which also is secured to the bracket 94 and normally pulls this end of the lever 109 upwardly. The lever 109 is provided with a depending arm 111 through which there extends a set screw 112 which is designed to bear against a many sided cam 113 mounted upon a shaft 114 which in turn is rotatably carried in the brackets 106. A knurled hand wheel 115 is rigidly secured at one end of the shaft 114 by turning which the various surfaces of the cam 113 can be presented to the set screw 112, thereby regulating the distance which the guides 108 can be pulled upwardly angularly by the spring 110 and determining the position of the guides 108. Tire flaps 116 are positioned upon the table 104. During each period of rest of the conveyor a cross bar 15 is positioned between guide 108 and bracket 94. One of the tire flaps is placed manually upon the knife edges of the cross bar 15 in such a position that one edge contacts with the guides 108. As the conveyor is moved forwardly in its intermittent travel, the tire flap is held in position manually until the clamps 19 are sprung into position to grip it. As the tire flap moves downwardly around the sprockets 10, the flap engages the guides 108 and depresses their outer ends about the spindle 107 against the tension in the spring 110 until the tire flap slides past the guides, when they are returned to their original position due to the contraction of the spring. The clamping action is effected as follows (see Figs. 1, 3 and 4): The shaft 20 upon which the clamp 19 is carried is provided at its end with a tripping member 117 which is rigidly mounted thereon. Member 117 carries two projecting cam portions 118 and 119, the respective surfaces 120 and 121 of which are adapted to be engaged by suitable arms to rotate the member 117. A spring 122 is secured at one end to a projection 123 carried by the member 117 and at its other end is secured to a cross bar 15. An arm 124 is carried by each of the brackets 12 and 13 and is provided with a roll 125 which is so positioned that as the clamp 19 is carried past the same, the surface 120 of the projection 118 will be engaged by the roll and thereby rotate the tripping member 117, and as the member 117 rotates, the spring 122 connected thereto is carried across dead center in position to yieldingly hold the clamp 19 against the flap. The tire flap, held in position in the manner described, is conducted in intermittent travel through the paint receptacle 5 and outwardly to a position over a receptacle 126 at which position the clamps 19 are caused to release their grip upon the tire flap and the latter is dropped by gravity into the receptacle 126. The unlatching of the clamp is effected by means of the roll 51 of the arm 50 which is carried by the bearing 43. This roll is engaged by the surface 121 of the projection 119 of the member 117 and turns the member 117 in its reverse rotary movement. Clamp 19 is thus sprung outwardly to the position shown in dotted lines in Fig. 4 and is held in this position by the spring 122. The receptacle 126 into which the tire flaps drop may be of any construction desired, that illustrated in the drawings comprising a body portion 126 which is mounted upon wheels 127. In place of the receptacle 126 any other suitable means for removing the tire flaps may be substituted, such for example as an endless conveyor.

Coating material is supplied to the receptacle 5 from a reservoir 132 which is mounted at one side of the conveyor, being rigidly supported by two angle bars 133 and 134 which are carried by the base member 2. The reservoir 132 is connected to the paint receptacle 5 by means of a pipe 135, valve 136 controlling the supply of coating composition from reservoir 132 to receptacle 5. A stirrer is provided for agitating the coating composition in the reservoir 132, which stirrer is comprised of the beater arms 137 which are mounted on a horizontal shaft 138, which shaft is mounted rotatably in suitable bearings both in the reservoir 132 and in a bracket 139 which is secured to the support 35. Shaft 138 carries rigidly secured thereto a sprocket 140 about which a chain 141 passes. The opposite end of the chain is engaged and driven by a sprocket 142 which is rigidly affixed to the shaft 75 previously described. A sprocket 143 is carried by a bracket 144 which depends from the lower side of the angle bar 133 and serves as a means for tightening the chain. The reservoir 132 is provided with a cover 144. A drip pan 145 extends diagonally upwardly from the rear end of the receptacle 5 to catch the drip from the tire flaps as they are withdrawn from the body of coating composition. An overflow pipe 146 and a drain cock 147 are attached to the paint receptacle 5.

In the operation of the machine, the conveyor is started in its intermittent travel and during a period of rest of the conveyor a tire flap 116 is taken from a group of the same upon the table 104 and is positioned upon the supports 17 of a cross bar 15 which lies between guides 108 and 94. As the conveyor continues its intermittent travel, the tire flap is held in position upon the supports manually until the clamps 19 are caused to be sprung into clamping engagement with the tire flap. The tire flap is then conducted at a sharp angle into the receptacle containing coating composition, is carried therefrom at a sharp angle due to the inclination of the guide rails 34 and is then conducted away by the conveyor, the latter being of sufficient length to permit the flap to dry. The dried tire flap finally reaches a point in its travel immediately over the receptacle 126, at which point the grip of the clamp upon the flap is released and the latter drops by gravity into receptacle 126 in which it may be removed to any desired location. The clamps continue their travel back to the position between the guide 108 and bracket 94 where another tire flap is positioned upon them.

While the invention has been particularly described as applied to the painting of truck tire flaps with coating material, it will be understood that any other elongated object which can be carried by the machine will be coated equally as well and the claims are to be so understood.

Having thus described my invention, what I claim and desire to protect by Letters Patent is:

1. In a conveyor, an article holder comprising, in combination, means for supporting the article, means for clamping the article to the supporting means, cam means whereby the clamping means may be manipulated to clamp and to release the article, and means comprising a single spring for maintaining the clamping means in clamping position and in releasing position.

2. In a conveyor, an article holder comprising, in combination, means for supporting the article, means for clamping the article to the supporting means, cam means whereby the clamping means may be manipulated to clamp and to release the article, means comprising a single spring for maintaining the clamping means in clamping position and in releasing position, and spring means acting on the clamping means for resiliently holding the article in place.

3. In a coating apparatus, a conveyor, means for actuating the same, article supports carried by the conveyor, movable guide means mounted adjacent the conveyor for regulating the position of an article placed upon the supports, means for securing the article to the supports upon movement of the conveyor, said guide means extending into the path of travel of the article and being adapted to be brushed aside by engagement of the article therewith during travel of the conveyor, means associated with the guide means for returning the guide means to its original position, and a container for coating composition through which the article is adapted to be drawn by the conveyor.

4. A coating apparatus comprising an endless conveyor, means for supporting and clamping a tire flap thereon, means for supplying a tire flap to said conveyor comprising pivotally mounted guides for supporting a tire flap before being placed in clamped engagement with said conveyor and adapted to yieldingly move out of the path of said flap during its movement with the conveyor immediately following the clamping of the flap to the conveyor.

5. A coating apparatus comprising an endless conveyor, means for supporting and clamping a tire flap thereon, means for supplying a tire flap to said conveyor comprising pivotally mounted guides for supporting a tire flap before being placed in clamped engagement with said conveyor and adapted to yieldingly move out of the path of said flap during its movement with the conveyor immediately following the clamping of the flap to the conveyor, and means for returning said guides to their initial position preparatory to another clamping operation.

Signed at Detroit, county of Wayne, State of Michigan, this 26th day of August, 1927.

CLYDE J. SMITH.